3,472,771
LUBRICATING COMPOSITIONS INCLUDING A POLYMER WHICH CONTAINS A SALT OR AMIDE OF A POLYETHERAMINE AND AN ACID
Donald C. Grimm, Cuyahoga Falls, Ohio, and Leonard Pierce, Jr., St. Albans, W. Va., assignors to Union Carbide Corporation, a corporation of New York
No Drawing. Filed Nov. 8, 1966, Ser. No. 592,751
Int. Cl. C10m 1/32
U.S. Cl. 252—34     4 Claims

ABSTRACT OF THE DISCLOSURE

The viscosity index and dispersant properties of lubricating compositions are improved by the addition thereto of a copolymer of (1) an oil-solubilizing monomer and (2) a salt, or amide, of an unsaturated carboxylic acid and a polyetheramine.

---

The invention relates to lubricating compositions that contain a polymeric additive as a viscosity index improver and dispersant. In a particular aspect, the invention relates to hydrocarbon lubricating oils that contain as additives copolymers of an oil-solubilizing monomer and a salt or an amide of an acid and a polyetheramine.

Internal combustion engine lubricants are being called upon to perform at high levels of efficiency over increasingly long periods of time. Polymeric and other additives are employed in such lubricants to improve the viscosity index, to increase the detergency and the dispersant properties of the oil, to increase the load-bearing properties of the oil, and the like. This invention is concerned with a polymeric additive that serves the dual purpose of being a viscosity index improver and a dispersant.

The polymeric additives of the invention are copolymers (i.e., polymers of two or more monomers) of an oil-solubilizing monomer and a monomer imparting dispersant properties to the oil.

The oil-solubilizing monomer is normally a long chain (e.g., $C_8$–$C_{20}$) alkyl acrylate or methacrylate. Specific illustrative examples include octyl acrylate, nonyl methacrylate, isodecyl acrylate, decyl methacrylate, undecyl acrylate, lauryl acrylate, tridecyl methacrylate, myristyl acrylate, palmityl acrylate, stearyl acrylate, stearyl methacrylate, eiscosyl acrylate, and the like. It may be desirable to employ a mixture of two or more oil-solubilizing monomers. For instance, it is desirable in some cases to employ an alkyl acrylate or methacrylate wherein the alkyl has at least 16 carbon atoms in combination with a shorter chain alkyl (e.g., $C_{10}$–$C_{12}$) acrylate or methacrylate. The longer chain alkyl groups help to increase the dispersant capacity of the polymer in order to help to prevent the polymer from losing oil-solubility by association with the partially oxidized products of combustion that constitute the major portion of engine sludge. It is thus desirable that at least 15 weight percent, preferably at least 20 weight percent, and more preferable at least 30 weight percent of the oil-solubilizing monomer be an alkyl acrylate or methacrylate wherein the alkyl has 16 or more carbon atoms. A mixture of stearyl acrylate and isodecyl acrylate is a preferred oil-solubilizing monomer mixture.

It may also be desirable to include a small amount of a short chain alkyl acrylate or methacrylate in the polymer in order to enhance the viscosity index improving properties of the polymer. Specific illustrative examples include methyl methacrylate, methyl acrylate, ethyl methacrylate, isopropyl acrylate, butyl acrylate, and the like. Methyl methacrylate is preferred. The short chain (e.g., $C_1$–$C_4$) alkyl acrylate or methacrylate is usually used in small amounts, for example, from about 3 to about 15 weight percent of the total polymer weight. In lieu of, or in addition to, the short chain alkyl acrylate or methacrylate, there can be employed a small amount of alkylthioalkyl acrylate or methacrylate to further enhance the viscosity index improving properties of the copolymer. The alkylthioalkyl acrylate or methacrylate also enhances the dispersant properties of this copolymer. Examples include methylthioethyl acrylate, methylthioethyl methacrylate, ethylthioethyl acrylate, 2,3-bis(methylthio)propyl acrylate, and the like. The alkylthioalkyl acrylate or methacrylate is generally employed in small amounts, for instance, of from about 1 to 10 percent based on weight of copolymer.

The monomeric component that imparts dispersant properties to the copolymer is a salt or an amide of a polymerizable acid and a polyetheramine. The polymerizable acids contemplated include unsaturated acids such as acrylic acid, methacrylic acid, maleic anhydride or acid, fumaric acid, and the like, and thioglycolic acid which can enter a polymer chain by acting as a chain transfer agent. The polyetheramines that are employed are those compositions that are represented by Formula I:

(I)              $R(OCH_2CH_2CH_2NH_2)_n$ wherin R represents the residue after removal of the hydroxyl groups of a polyoxypropylene alcohol having $n$ hydroxyl groups, and wherein $n$ represents a number having a value of from 1 to 3.

The amines employed in the invention can be prepared by cyanoethylation of a polyoxypropylene alcohol of the formula R(OH), wherein R and $n$ have the meaning stated above, followed by reduction of the cyanoethyated product to the corresponding amine. This method of production is illustrated by the following two equations:

(a) 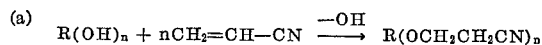

The alcohol is reacted with acrylonitrile in the presence of a base catalyst.

(b) 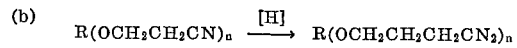

After neutralizing the base catalyst, the cyanoethylated product is hydrogenated. The hydrogenation is carried out in conventional equipment in the presence of, for example, a nickel on kieselguhr catalyst. It is also desirable to conduct the hydrogenation in in the presence of a small amount (e.g., 10 weight percent) of anhydrous ammonia and pyridine. The hydrogenation can be carried out at, for example, 110° to 130° C. and 950 to 2000 p.s.i.g. pressure. At these conditions, the hydrogenation normally takes up to 3 or 4 hours.

The alcohols employed to produce the amines are polyoxypropylene alcohols having from 1 to 3 hydroxyl groups and molecular weights of from about 400 to about 5000. These polyoxypropylene alcohols are well known compositions that can be produced by adding propylene oxide or a mixture of propylene oxide and ethylene oxide to starter compounds containing from 1 to 3 active hydrogens (usually amino or alcoholic hydroxyl hydrogens). Specific examples of such starter compounds include methanol, ethanol, isopropyl alcohol, butanol, pentanol, hexanol, octanol, decanol, water, ethylene glycol, propylene glycol, diethylene glycol, butylene glycol, glycerol, 1,2,4-hexanetriol, 1,1,1-trimethylolpropane, ammonia, isopropanolamine, mono-, di-, and triethanolamine, and the like. When ethylene oxide is employed in conjunction with propylene oxide to produce the polyoxypropylene alcohol, the ethylene oxide can be employed in proportions such that the additive copolymers of the invention retain oil-solubility. Usually, not more than 50 weight percent (based on total alkylene oxide weight) of ethylene oxide will be employed.

The polyetheramine is incorporated into the copolymer of the invention by the formation of a salt or an amide (or imide, in the case of maleic anhydride or acid) with the acid contained in the copolymer. The polyetheramine can be simply mixed with the monomeric components of the copolymer during the polymerization step, or it can be mixed with the copolymer after it has been polymerized. By following this procedure, a salt is formed. If desired, the polyetheramine can be reacted with the acid (either before or after the acid has been incorporated into the copolymer) under dehydrating conditions to form the amide, or, when the acid is maleic, the imide, of the polyetheramine and acid. When salt form of the copolymer is employed, it is likely that some dehydration to the amide will occur during use, and this is within the scope of the invention.

The salt or amide is employed in the copolymer in an amount sufficient to enhance the dispersant properties of the lubricating oils that contain the copolymer. For instance, the acid can be employed in amounts of from about 0.5 to about 25 mole percent, and preferably from about 3 to 6 mole percent, of the polymerizable, monomeric components of the copolymer. The mole ratio of acid: polyetheramine can vary from about 1:1 to about 3:1, depending upon the functionality of the acid and the amine. It is preferably that sufficient amine be employed to neutralize substantially all of the acid.

The copolymer of the invention can be produced by conventional polymerization techniques. For instance, the monomers can be mixed in the desired proportions along with a polymerization initiator. (The polyetheramine can also be included in this reaction mixture, either per se or in the form of the amide or imide of the acid used.) The polymerization reaction is then usually started by heating the reaction mixture to a temperature of at least the activation temperature of the initiator. The specific temperature employed will, of course, vary with the nature of the monomers and the initiator, but is usually within the range of from about 40° to about 110° C.

Polymerization initiators that can be employed include peroxides and azo compounds. Examples include t-butyl peroxypivalate, benzoyl peroxide, methyl ethyl ketone peroxide, t-butyl hydroperoxide, t-butyl perbenzoate, cumene hydroperoxide, azodiisobutyronitrile, dimethyl-azodiisobutyrate, isopropylperoxydicarbonate, and the like. Also useful are combinations of quaternary ammonium salts and peroxides. Examples of such salts include diisobutylphenoxyethoxyethyl - dimethylbenzyl ammonium chloride, lauryl-dimethylbenzyl ammonium chloride and the like. The polymerization initiator is employed in conventional amounts, such as from about 0.05 to about 0.5 weight percent, based on weight of monomers.

It is usually convenient to carry out the polymerization in a solvent such as pentane, hexane, heptane, octane, xylene, toluene, benzene, naphtha, or the like. When a volatile solvent is employed it can be distilled at the conclusion of the polymerization after oil has been added to the copolymer solution. This procedure produces a concentrated solution of the copolymer in oil and is a very convenient way to recover the copolymer.

The molecular weight of the copolymer that is useful in the invention is usually expressed in terms of reduced viscosity ($I_r$). Reduced viscosity is defined by the equation:

$$I_r = \frac{T - T_o}{T_o(c)}$$

wherein I is the time required for a low concentrate copolymer solution to pass through a standard Ubbelohde viscometer, $T_o$ is the time for the pure solvent to pass through the viscometer, and $c$ is the concentration of the copolymer in grams of copolymer per 100 milliliters of solvent. Unless otherwise specified, the reduced viscosities of the copolymers discussed herein were determined in a solution of 0.1 gram of copolymer in 100 milliliters of benzene at 20° C.

It has been found that the copolymers that are useful in the invention generally have reduced viscosities in the range of from about 0.4 to about 2.2 and preferably from about 1 to 1.6.

The copolymers of the invention are employed as additives in oils in an amout sufficient to enhance the viscosity index and dispersant characteristics of the oil. Normally, amounts of from about 0.5 to about 3 weight percent of the copolymer are employed (percentages being based upon weight of oil). The oils employed are the hydrocarbon oils of lubricating viscosity, whether of natural origin or synthetic. Preferred oils are substantially paraffinic and/or naphthenic, although some aromatic hydrocarbons can be present in the oil. The nature and production of such oils are well known.

It is within the scope of the invention to employ other types of additives in the lubricating compositions of the invention. Antioxidants, extreme pressure agents, pour point depressants, and the like are examples of known types of additives.

The lubricating compositions of the invention are useful in automobile crankcases and as lubricants in other internal combustion engines.

In the Examples which follow, the polyetheramines employed are represented by Formula I as shown below:

$$R(OCH_2CH_2CH_2NH)_n$$

Polyethermonoamine A.—R is the residue of the propylene oxide adduct of butanol having an average molecular weight of 1200, and $n$ is 1. Polyethertriamine B.—R is the residue of the propylene oxide adduct of glycerol having a molecular weight of about 3000, and $n$ is 3. Polyetherdiamine C.—R is the residue of polypropylene glycol having a molecular weight of about 1000, and $n$ is 2.

EXAMPLE 1

Into a one-pint Pyrex pressure bottle the following were charged: 49.0 Lauryl methacrylate, 13.96 g. Polyethermonoamine A, 63.96 g. heptane, 1.0 g. methacrylic acid, and 0.2 g. azobisisobutyronitrile. After flushing with nitrogen the bottle was capped and rotated end-over-end in a 75° C. constant temperature bath for 24 hours. The conversion of monomers to polymer was 87.6 percent. Three grams of this polymer were dissolved in 97 grams of a 200 SUS oil. A mixture of 29 grams of this blend and 12 grams of Standardized Oil Filter Test Contaminant No. 1 was then centrifuged at 1500 r.p.m. and 20° C. for 5 hours. A sediment level of only 3.0 ml. was obtained whereas a level of 4.3 ml. was observed with a blend containing either no polymer or a non-dispersant VI improver polymer. This difference shows that the copolymer of this invention has dispersing properties.

EXAMPLE 2

254.88 g. isodecyl methacrylate, 42.0 g. Polyethertriamine B, 3.42 g. methacrylic acid, 210.0 g. heptane, and 30.0 g. of a 3 percent solution of azoisobutyronitrile in benzene were weighed into a liter kettle, purged with $N_2$ for 10 minutes and then agitated for 14 hours at 75° C. and 260 to 400 mm. Hg pressure. Determination of total solids indicated that the above monomers were converted essentially 100 percent into polymer. This polymer had a 3.5 ml. sediment level in the centrifugal sludge dispersance test. Also, it was evaluated in a modified Chevrolet FL–2 engine test. The modifications consist of using a lower crankcase temperature and using a fuel containing a higher percentage of olefins and aromatics. A blend of 1.17 percent of this polymer and 1.0 per Amoco 193 inhibitor in a 200 SUS oil received a sludge score of 70.8 (a rating of 80 is possible) whereas a blend of 1.0 percent Amoco 193 inhibitor in the same 200 SUS oil had a sludge score of only 61.5. (Amoco 193 inhibitor contains about 50 weight percent zinc dialkyldithiophosphate.)

EXAMPLE 3

282.28 g. isodecyl methacrylate, 15.20 gms. Polyetherdiamine C, 2.22 gms. methacrylic acid, 223.0 gms. heptane, and 22.5 gms. of a 2 percent solution of azobisisobutyronitrile in benzene were weighed into a 1-liter kettle, purged with nitrogen for 25 minutes, and then stirred at 65° C. and 180 to 264 mm. Hg pressure for 20 hours. The monomers were converted 100 percent to polymer. A level of 3.1 ml. of a 3 percent blend was received in the centrifugal sludge dispersancy test.

EXAMPLE 4

Thirty grams (0.00949 g. mole) of Polyethertriamine B and 1.85 g. (0.1888 g. mole) of maleic anhydride were reacted in heptane at 100° C. for 3 hours with the removal of water. The final solution in heptane contained 49.7 percent of the Polyethertriamine B-maleic anhydride imide. At room temperature this imide is insoluble in heptane whereas Polyethertriamine B is soluble. Into a one-pint Pyrex pressure bottle the following were weighed: 4.02 grams of the warmed and agitated heptane solution of the above imide, 48.0 grams of isodecyl acrylate, 31.28 grams of heptane, and 0.1 gram of tertiary butyl peroxypivalate. After polymerizing for approximately 40 hours at 50° C., a conversion of 99.4 percent of monomer to polymer was obtained. A blend of 1.17 grams of this copolymer in 98.83 grams of a 200 SUS oil had a 3.0 ml. sediment level in the centrifugal sludge dispersancy test. In addition to dispersing properties this copolymer also is a viscosity index improver. This same 1.17 percent blend has a 210° F. viscosity of 10.84 centistokes, a 100° F. viscosity of 76.80 centistokes and a viscosity index of 127.5.

EXAMPLE 5

A copolymer of methylthioethyl acrylate (10 g.) and isodecyl acrylate (90 g.) was prepared in a Pyrex pressure bottle with azoisobutyronitrile (0.2 gram) initiator and heptane solvent (42.8 g.) at 55° C. One hundred percent conversion of these monomers to polymer was obtained. The reduced viscosity at 20° C. was 1.35 (0.1 g. polymer in 100 ml. benzene). A blend of 1.17 percent polymer and 1.0 percent of Amoco 193 inhibitor in a 200 SUS oil was evaluated in a modified Sequence 5A engine test. The single cylinder Sequence 5A test emphasizes the anti-sludging, anti-clogging, and insolubles suspension characteristics of the lubricant. The modification of this standard test included elimination of the hot soak period, increased piston ring blow-by, and elimination of all oil additions. After 72 hours of testing, the engine had an average sludge rating of 7.7. This average rating is obtained from the same eight parts rated in the standard Sequence 5A test. A 10 rating indicates a perfectly clean engine. A 7.7 rating after only 56 hours of testing was received by a blend of 200 SUS oil and 1 percent Amoco 193 inhibitor. The 16-hour extension of the time required to give a 7.7 rating is considered to be a demonstration of the dispersant properties of the polymer.

Into another one-pint Pyrex pressure bottle was charged: 87.0 grams of isodecyl acrylate, 39.76 grams of heptane, 10.0 grams of methylthioethyl acrylate, 6.04 grams of the warmed and agitated heptane solution of the imide of Example 4, and 0.2 gram of azobisisobutyronitrile. After polymerizing for 42 hours at 55° C., 100 percent conversion of these monomers to polymer was obtained. A blend of 1.17 percent of this terpolymer and 1.0 percent Amoco 193 inhibitor in the same base oil used for the previous test was also tested in the modified Sequence 5A engine test. An average sludge rating of 9.0 after 120 hours of operation was obtained. This performance is significantly improved over that of the copolymer and also over that of a commercial VI improver-dispersant tested at the same conditions. After 104 hours of testing an average sludge rating of 7.4 was obtained for the blend containing the commercial additive. In addition to these dispersing properties, the terpolymer blend had a 210° F. viscosity of 11.32 cs. and a VI of 141.5.

EXAMPLE 6

Into a one-pint Pyrex pressure bottle the following were charged: 50 grams lauryl methacrylate, 7.8 grams Polyethermonoamine A, 0.7 gram thioglycolic acid, 58.4 grams heptane, and 0.124 gram azoisobutyronitrile. After flushing with nitrogen, the bottle was capped and rotated end-over-end in a 75° C. constant temperature bath for 25 hours. A three percent blend of the resultant polymer in a 200 SUS oil was prepared and the dispersancy evaluated by centrifuging at 1500 r.p.m. for 5 hours a mixture of 29 grams of this 3 percent blend and 12 grams of Standardized Oil Filter Test Contaminant No. 1. A sediment level of 3.0 ml. showed this polymer has dispersing properties.

What is claimed is:

1. A lubricating composition that comprises a major amount of a hydrocarbon oil of lubricating viscosity, and a minor amount, sufficient to enhance the detergent characteristics of said oil, of an oil soluble polymer of (a) an oil-solubilizing proportion of a long chain alkyl acrylate or methacrylate wherein the alkyl moiety contains from about 8 to aobut 20 carbon atoms, and (b) a salt or amide of a polymerizable carboxylic acid selected from the group consisting of unsaturated lower aliphatic hydrocarbon carboxylic acids and thioglycolic acid and a polyetheramine of the formula:

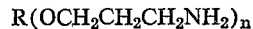

$$R(OCH_2CH_2CH_2NH_2)_n$$

wherein R represents the residue after removal of the hydroxyl groups of a polyaxypropylene polyol having a molecular weight of from about 400 to about 5000 and having $n$ hydroxyl groups, and where $n$ represents a number having a value of from 1 to 3, wherein said salt or amide is present in amounts of from about 0.5 to about 25 mole percent of the polymerizable monomeric components of said polymer.

2. The lubricating composition of claim 1 wherein the polymerizable carboxylic acid is acrylic acid, methacrylic acid, maleic acid, fumaric acid, or thioglycolic acid.

3. The lubricating composition of claim 1 wherein the polyoxypropylene polyol is a propylene oxide adduct of a hydroxyalkane having from 1 to 3 hydroxyl groups.

4. The lubricating composition of claim 1 wherein the polymerizable carboxylic acid is maleic acid and wherein the polyoxypropylene polyol is the propylene oxide adduct of glycerol.

References Cited

UNITED STATES PATENTS

| | | |
|---|---|---|
| 2,737,496 | 3/1956 | Catlin. |
| 2,892,792 | 6/1959 | Stewart et al. |
| 2,892,816 | 6/1959 | Lowe et al. |
| 3,052,648 | 9/1962 | Bauer. |
| 3,172,856 | 3/1965 | Ovist et al. |
| 3,194,763 | 7/1965 | Gordon et al. |

PATRICK P. GARVIN, Primary Examiner

U.S. Cl. X.R.

252—47.5, 51.5